Aug. 5, 1952     O. H. BANKER     2,605,653
CHANGE SPEED MECHANISM
Filed Oct. 13, 1945     3 Sheets-Sheet 2
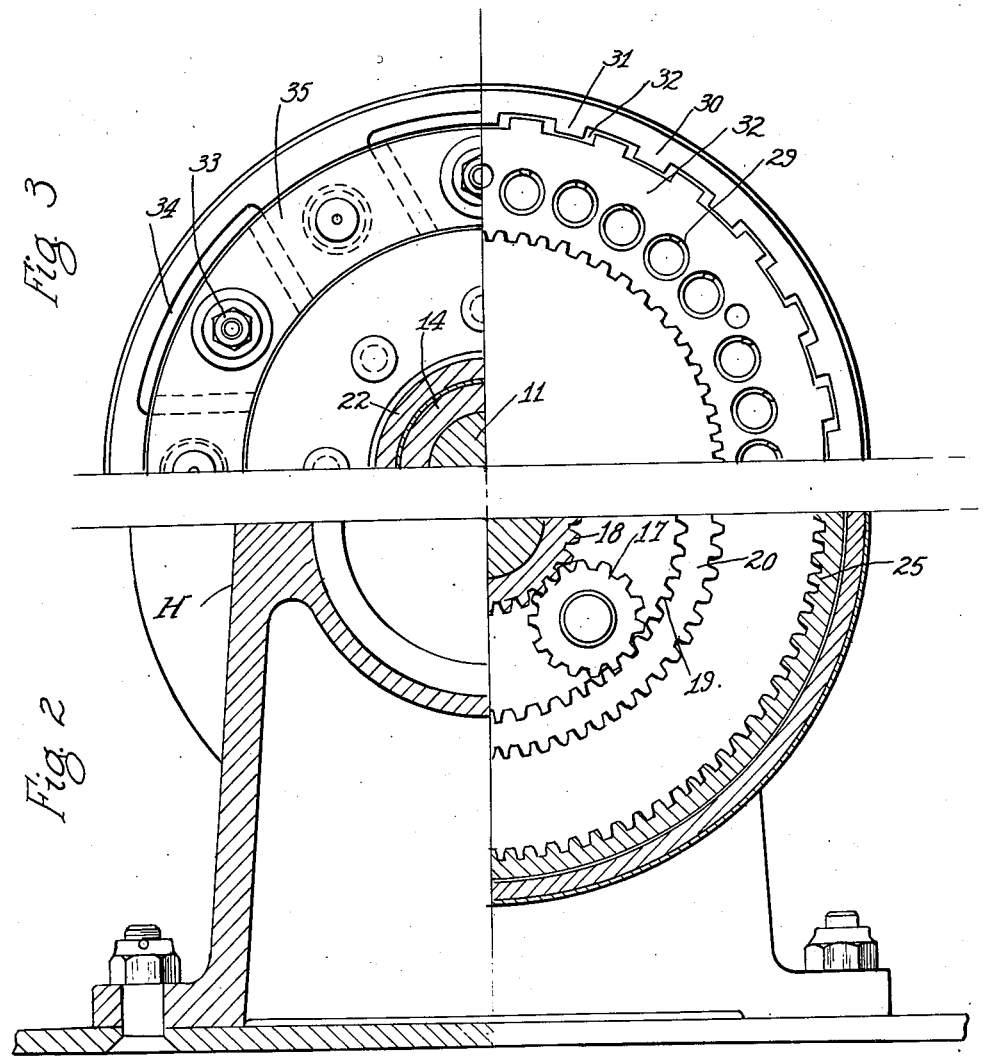
INVENTOR.
Oscar H. Banker
BY
Cromwell, Greist + Warden
ATTORNEYS Aug. 5, 1952  O. H. BANKER  2,605,653
CHANGE SPEED MECHANISM
Filed Oct. 13, 1945  3 Sheets-Sheet 3
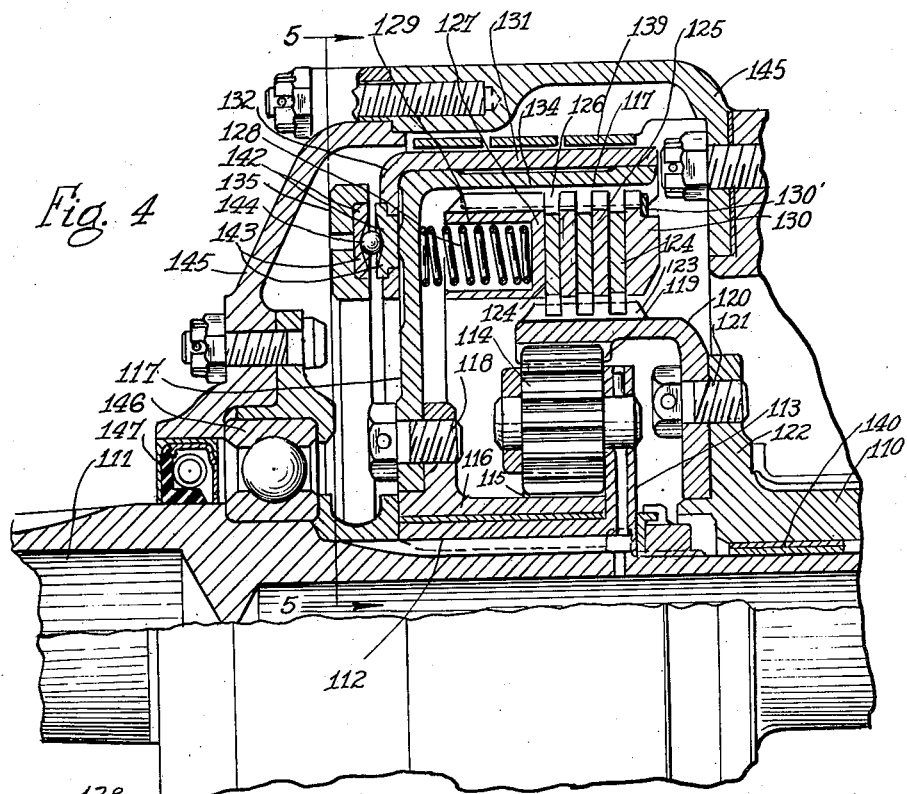
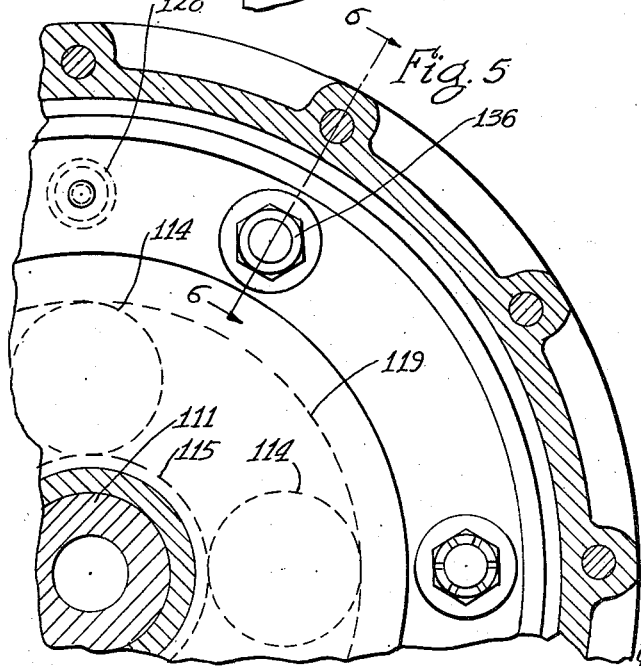
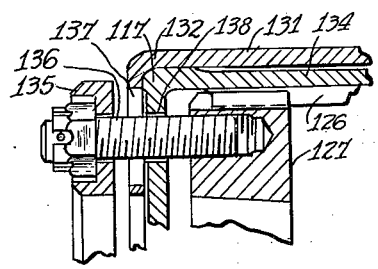
INVENTOR.
Oscar H. Banker
BY Cromwell, Greist & Warden
ATTORNEYS Patented Aug. 5, 1952

2,605,653

UNITED STATES PATENT OFFICE 2,605,653

CHANGE SPEED MECHANISM

Oscar H. Banker, Evanston, Ill., assignor to New Products Corporation, Chicago, Ill., a corporation of Delaware Application October 13, 1945, Serial No. 622,137

6 Claims. (Cl. 74—781)

This invention relates to improvements in a change speed mechanism having various applications in the transmission of power from a driving to a driven member or members.

It is an object of the invention to provide a change speed mechanism of the planetary type which is very simple, compact and light in weight considering its capacity, yet rugged in structure.

A further and more specific object is to provide a planetary-type change speed mechanism of the character referred to, including a clutch controlling the operation of the same whereby differentials in speed of a power take-off member are obtained without disengaging the main engine clutch, enabling control of turning by a positive driving torque at all times.

Yet a further object is to provide a clutch controlled change speed mechanism and novel driving means associated with the clutch, in a manner to effectively transmit power through the same without destructive wear or damage to the elements thereof.

More specifically, it is an object of the invention to provide a planetary-type change speed mechanism including a driving member and speed ratio controlling means drivingly connecting said member with a driven member for transmission of power at variable speed ratio, said means including a clutch which has improved features of construction contributing to a markedly increased length of life.

A still further object is to provide a change speed mechanism embodied as a driving and steering device for track-laying vehicles, having a novel mounting of a power actuated driving shaft, with planetary gear carriers telescopingly journaled on opposite ends and overhanging a pair of coaxial driven shafts in splined driving relation to the latter, said carriers being provided with a fixed rotative bearing outwardly of the power actuated shaft and providing an intermediate journal for a relatively rotatable control or reaction device.

Yet a further object is to provide a pilot power-actuated shaft mounted in the foregoing manner wherein a substantial compacting of the mechanism is effected, from the standpoint of space, and which provides a rigid distortion-resistant structure in the direction of the shaft, drivingly coupled to a pair of opposite driven shafts in a manner to prevent transfer of radial throw to said shafts.

A still further specific object is to provide a change speed mechanism of the planetary type involving a power actuated driving gear, a relatively rotatable reaction gear and planetary pinions mounted on a planetary carrier and associated with said gears in a manner to effect maximum economy of space.

A still further specific object is to provide a change speed mechanism for a driving and steering or like device, driven through a ring gear from a propeller shaft normal to the output shafts, including anti-friction rollers or similar bearings journaling the power shaft of the mechanism having readily accessible means for taking up the bearings for wear, so that effective driving engagement of the ring gear with a propeller shaft is had at all times.

Yet another object is to provide a change speed mechanism illustratively embodied in a plane-mechanism illustratively embodied in a planetary-type driving and steering device for a track-laying or like vehicle, wherein turning of the vehicle is controlled through a brake actuated control member governing rate of rotation of a reaction member, said device being provided with a further service brake effective on the planetary carrier or other appropriate member to provide an additional means controlling the speed of the vehicle.

The foregoing statements are indicative in a general way of the nature of the invention, but other and more specific objects will be apparent to those skilled in the art upon a full understanding of the construction and operation of the device.

Two embodiments of the invention are presented herein for the purpose of exemplification, but it will be appreciated that the invention is susceptible of incorporation in other modified forms coming equally within the scope of the appended claims.

In the drawings,

Fig. 1 is an elevational view partially broken away and in longitudinal vertical section, illustrating the invention in one embodiment as applied to a driving and steering mechanism;

Figs. 2 and 3 are sections on lines corresponding to lines 2—2 and 3—3, respectively, of Fig. 1;

Fig. 4 is a fragmentary view partially broken away and in vertical longitudinal section, illustrating details of a modified embodiment of the change speed mechanism as applied to an aircraft propeller drive;

Fig. 5 is a fragmentary view in section on a line generally corresponding to line 5—5 of Fig. 4; and Fig. 6 is a fragmentary view in section on a line generally corresponding to line 6—6 of Fig. 5.

Figure 1:
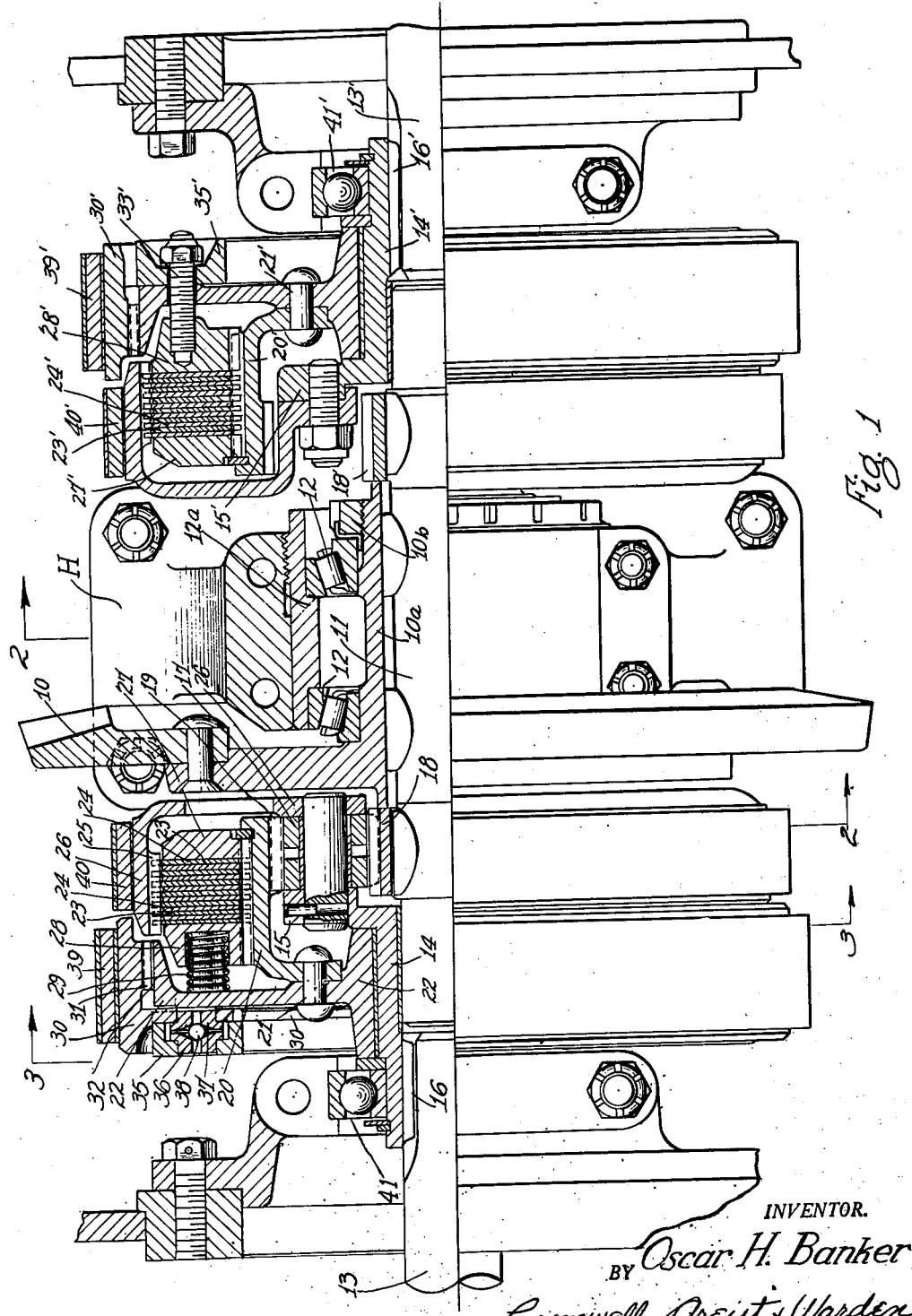

This invention relates to a planetary-type change speed mechanism of the sort embodied in my copending application Serial No. 588,222, filed April 13, 1945, now Patent No. 2,486,815. This mechanism is herein illustrated in two alternative modifications, applied respectively to a driving, steering and braking device for creeper-type vehicles, and to a speed reduction device for an aircraft propeller drive.

In Figs. 1, 2 and 3 of the drawings I illustrate an application of the invention referred to above to a driving, steering and braking mechanism for a well known type of creeper or track-laying vehicle. This mechanism eliminates various dangerous drawbacks in existing differential-type planetary driving and steering mechanisms for creeper tractors, and affords a fingertip control enabling small radius turning with the tracks under driving power at all times.

Here the power is derived from an engine driven propeller shaft (not shown) acting on a large bevel ring gear 10 keyed on a central driving shaft 11 for the device, said gear being mounted in a fixed housing H on tapered roller bearings 12 surrounding the shaft.

In effecting this mounting, I employ a cylindrical cage 12a which is axially threaded into the housing H, said cage having thrust engagement with the outer race of the left-hand bearing 12 and being abuttingly engaged by the right-hand outer bearing race. The inner races are mounted on the hub 10a of ring gear 10 and a take-up ring 10b threads on the end of said hub for thrust engagement with the right-hand inner race. A spanner may be used to take up end play as desired.

Inasmuch as power is transmitted from shaft 11 to both the right-hand and the left-hand tracks of the vehicle through identical change speed devices in accordance with my invention, the parts of the device controlling the right-hand drive will be designated by primed reference numerals.

The driven, or power take-off, shaft is designated 13, being axially aligned with shaft 11 and having the sleeve-like hub 14 of a planetary carrier 15 splined thereon at 16. Said carrier has equally spaced planetary gears 17 journaled thereon which mesh with a driving sun gear 18. Gear 18 is keyed on driving shaft 11 or otherwise rotatable with the ring gear 10, as by being formed integral therewith. The planet gears 17 also mesh externally with an outer reaction gear 19 on the internal periphery of a clutch driving and reaction gear ring 20. This ring is secured by rivets 21 to a reaction gear control drum 22, said drum being rotatably mounted on the hub 14 of planetary carrier 15.

The ring 20 has axially slidable, splined driving engagement on its external periphery with a plurality of axially spaced friction clutch disks 23; and alternating with the disks 23 similar friction clutch disks 24 are provided which have the external periphery thereof splined at 25 to the interior of a drum 26 bolted on planetary carrier 15, the function of which drum will hereinafter appear. At one side the friction disks are supported by an end thrust ring 27 splined on reaction ring 20 while compressive force is exerted through a thrust ring 28 by a plurality of coil compression springs 29 abutting the inner radial flange of the drum 22.

A lost motion driving connection is established between inner drum 22 and an outer control drum 30 through the agency of a plurality of radial lugs 31 on the inner periphery of drum 30 which engage in recesses 32 on the outer periphery of drum 22. The peripheral width of members or lugs 31 is less than the width of the recesses 32 to enable a lost motion of a few degrees in either direction of rotation, after which driving interconnection of the drums 22 and 30 obtains. In substitution for such lost motion connection, provisions of the type embodied in my said copending application Serial No. 588,222, or in the embodiment shown in Figs. 4, 5 and 6, may be employed.

Clutch thrust ring 28 is actuated to automatically disengage the friction disks 23, 24 when desired by means of a plurality of studs 33 (see Fig. 3) extending through the radial flange of drum 22, which has apertures 34 to receive them, and threaded in ring 28. A ring-like clutch throw-out plate 35 is provided immediately to one side of drum 30 and coaxial therewith. This plate has a plurality of cam members 36 around its side adjacent said drum and the drum 30 has an equal number of similar cam members 37 in opposed relation thereto. Members 36, 37 have dished conical surfaces, between which the throw-out balls 38 are disposed. Hence, the balls will ride up on the cam surfaces and thereby throw the plate 35 outwardly, retracting ring 28 through studs 33 to disengage clutch disks 23, 24, upon retardation of control drum 30 and consequent rotary movement of drum 22 relative thereto, permitted by the lost motion connection of the drums. Retardation or braking of drum 30 is accomplished by a brake band 39 surrounding the same, the band being actuated by any conventional means. As is evident, the frictional grab needed to be applied by the brake band to retard and stop drum 30 is relatively small, since the force required to produce relative rotation of the drums 22, 30 arises naturally from the differential in inertia of the retarded and unretarded elements.

In order to enable direct braking of the output shafts 13, 13', a secondary service brake band 40 is provided for engagement with the above described drum 26 which is fixed on the planetary carrier 15. Since this carrier is directly splined on the driven shaft, braking of the latter can be obtained at any time, regardless of the condition of the clutch, by application of the brake band 40.

The brake band operative on drum 30 enables a fingertip control of the transmission of power from ring gear 10 to shaft 13 and/or 13', since great braking effort is not necessary in retarding the drum and reaction gear 19. This type of control employs a minimum of structural features. The spatial compactness of the assembly in general is also worthy of note. By journaling the planetary carrier on one end of the central main drive shaft 10, with splines overhanging and drivingly engaging the immediately adjacent end of driven shaft 13 or 13', I provide a substantial saving in space axially of the mechanism. Telescoping of the planetary gears 17, reaction gear 19, clutch elements and shaft brake drum 26 in substantially a single radial plane coincident with the sun gear 18 is responsible for this compactness.

At the same time, it will be noted that great strength and rigidity are afforded in the aligned, telescoped relationship of the drive shaft 11, planetary carrier and take-off shafts 13 and 13', which effectively resists distortion under the heaviest sort of loads. In order to adjust for end play in the ring gear, it is only necessary to adjust the take-up ring 12a which affords an expeditious method of servicing.

In operation, with both brake bands 39 and 40 disengaged and clutch thrust plate 28 operative to frictionally engage the disks 23, 24 with one another, power is transmitted from ring gear 10 and shaft 11 to sun and reaction gears 18 and 19 directly through planetary gears 17 locked to the planetary carrier 15, the shaft 13 being thus driven in a 1:1 ratio through the carrier splines 16. This is occasioned by reason of the above locking and inability of the planet gears to rotate relative to the gears 18 and 19. In this operation the inner and outer control drums 22, 30 rotate as a unit with a planetary carrier.

When brake band 39 is applied to retard or halt the outer control drum 30, the inner drum 22 is correspondingly retarded or halted after a few degrees of lost motion and disengagement of the clutch disks 23, 24. Such disengagement is effected through the tensioning of the studs 33 carried by thrust ring 28 and engageable by plate 35 in its cam actuated, clutch disengaging movement. Hence, since driving or reaction ring 20 is also retarded or halted, being fixed on the drum 22, gears 17 may rotate about their own axes, driven by sun gear 18 and reacted on by reaction gear 19. This epicyclic action results in motion being imparted to the planetary carrier and shaft 13 at a greatly reduced ratio and operation of the vehicle accordingly. As stated, further retardation of either or both of the aligned driven shafts 13, 13' is accomplished by applying brake band 40.

If desired, structure of the type illustrated in my said copending application Serial No. 588,222 may be incorporated to retain the parts in the clutch-releasing position against possible retrograde movement such as would cause chattering. However, these provisions are not involved as essential elements in the present structure, and hence I have not chosen to illustrate the same.

In the form shown, the mechanism provides the desired change speed features, along with an additional direct-acting brake, in a structure which is exceedingly compact and simple, yet extremely rugged withal. It should be noted that the sleeve-like hub 10a on which ring gear 10 is secured, and to which the central driving shaft 11 is keyed, has a very desirable roller bearing mount 12 in the cylindrical cage 12a clamped in housing H. Use of spanner wrenches on cage 12a and on the bearing take-up ring 10b enables the bearings to be adjusted to take up wear following protracted use and thereby preserve a proper driving engagement of the ring gear with the propeller shaft. These features are characterized by considerable compactness. Note also that the shaft 11 projects outwardly of its mount in housing H past the sun gears 18, 18', to afford a pilot journal for the sleeve-like hubs 14, 14' of the planetary carriers and that said hubs project still further outwardly to overhang the driven shafts 13, 13', at which point they are journaled in further fixedly supported ball bearings, designated 41, 41'.

The splined driving connection 16, 16' to output shafts 13, 13' enables a floating and self-compensating feature at this point which is desirable in preventing the transmission of any radial throw which may take place to the output shafts. All of these features are regarded as being of definite importance in a structure of the present type where strength and rigidity, coupled with simplicity, compactness and economy, are important.

The manner in which the control drum 22 and reaction gear ring 20 are journaled on the sleeve-like hub 14 of the planetary carrier is also worthy of note. This journal is located in radial alignment with the journal of the sleeve on the driving shaft pilot end, for increased economy of space. The disposition of the sun, planetary and reaction gears in radial alignment of the auxiliary brake drum 26 on the carrier 15 further contributes to the desired saving in space.

The very simple brake mechanism for the frictional retardation of drum 30 enables a fingertip control in every sense of the word; the efficacy with which this mechanism can be governed by pressure measured merely in ounces is quite surprising. While, as pointed out above, it is an easy matter, involving small frictional force, to retard and halt the loosely mounted drum 30, it thereafter requires considerable torque on the drum to produce rotation thereof in opposition to the brake band; this is due to the well known factor of starting friction. It may be stated that a very moderate application of control effort on the band 39 is effective to halt drum 30, and will maintain the same halted against relatively large rotative force.

Referring now to Figs. 4, 5 and 6 of the drawings, wherein a slightly modified embodiment of the invention is illustrated as a speed reduction device for an aircraft propeller drive, the reference numeral 110 designates a hollow tubular driving shaft, adapted to be connected directly or indirectly to the engine of the aircraft, or, since the principles of my invention are not unduly limited to any particular automotive or other field, or to any prime mover in association with which the use of a planetary change speed mechanism of compact construction is desired.

The driven shaft 111 has splined thereon the sleeve-like hub 112 of a planetary pinion carrier 113, said carrier having journaled thereon in a conventional fashion a plurality of planetary pinions 114 in equally spaced relation circumferentially of shafts 110 and 111. These pinions mesh with a continuous reaction gear 115 on the axially elongated hub 116 of a clutch driven drum 117, said drum being secured to the hub by a plurality of bolts 118. Likewise meshing with the pinions 114 is a continuous ring drive gear 119 which is formed on the internal circumference of an annular driving ring 120. Ring 120 is secured by bolts 121 to an integral flange 122 on driving shaft 110.

On its outer periphery the driving ring 120 is provided with splines 123 with which similar splines on a plurality of clutch friction disks 124 are engaged, the connection being such as to permit axial movement of the clutch disks 124, but to rotatively drive said disks with ring 120 as the latter is driven by shaft 110. Alternating with the disks 124 are a plurality of similar clutch disks 125 drivingly connected to splines 126 on the inner periphery of drum 117, this connection being likewise such as to allow axial movement of the disks 125 but to rotate drum 117 when the clutch disks 125 are subjected to rotative torque. When the clutch disks 124, 125 are engaged under axial thrust, full driving torque is transmitted, with a minimum of lost motion or backlash, from the driving ring 120 on the driving shaft to the clutch driven drum 117.

Axial clutch engaging thrust is applied by a clutch thrust ring or plate 127, which is, like the disks 125, engaged with the drum splines 126. Thrust ring 127 is urged axially for clutch engagement by a plurality of coil compression springs 128 abutting the radial flange of drum 117 at one end and the thrust ring at the other, being received in recesses 129 in said clutch thrust ring. And end or stop ring 130 at the opposite axial side of disks 124, 125, also engaged with the drum splines 126, and sustained by a thrust washer 130' axially secured to the splines, serves as the abutment against which the end thrust on the clutch disks is absorbed and supported.

Surrounding the clutch driven drum 117 I provide a generally similar clutch control drum 132, within the axial peripheral flange 133 of which the corresponding flange 134 of drum 117 is nested. Drums 117 and 132 have a rotative driving connection characterized by lost motion of a few degrees, similar to the first embodiment, as will now be described.

The clutch disks 124, 125 are released from engaged friction driving relation upon retardation or halting of drum 132 by means of a clutch throw-out ring 135. Said ring 135 is connected to the clutch pressure plate 127 through the agency of a plurality of circumferentially spaced studs 136 (see Fig. 6) which extends from throw-out ring 135 parallel to the shaft axis through apertures 137 in the outer control drum 132 and aligned apertures 138 in inner clutch driven drum 117. While the fit of the studs is fairly close in apertures 138, the apertures 137 are of sufficient size to permit relative lost rotative movement of a few degrees before the studs on drum 117 are engaged by drum 132 to halt the former. Clutch throw-out ring 135 and the adjacent outer surface of drum 132 are each provided with cam members 142 having hollow cam depressions 143 between which the thrust balls 144 are disposed.

Coacting with the outer drum 132 I provide a circumferential spiral brake band 139 actuable either in response to the speed of the propeller, through a conventional type of brake applying linkage, or actuated otherwise whereby when said brake band is applied, drum 132 is retarded or halted, with eventual retardation or halting of the inner clutch driven drum 117 through the lost motion, stud and drum driving connection described above.

Hence, upon application of brake band 139 and retardation and/or stopping of drum 132, the inner drum 117 and throwout ring 135 previously drivingly connected to the latter will continue to rotate a predetermined number of degrees sufficient to cause balls 144 to ride up the cam surfaces and thrust ring 135 outwardly. This in turn withdraws clutch pressure plate 127 outwardly to disengage the clutch disks 124, 125.

If desired, an arrangement may be made in this as well as the previously described form of the invention to lock the clutch in the thus disengaged position until it is time to re-engage the same. Provisions of this character have been illustrated in my said copending application Serial No. 588,222 identified above; however, they do not constitute part of the present invention and hence have not been illustrated.

In the operation of the above described change speed mechanism, when the brake band 139 is inoperative, the drivingly connected drums 117, 132 rotate as a unit with the drive ring 120, with resultant direct transmission of power from shaft 110 to driven shaft 111 in a 1:1 ratio. Since the planetary carrier 113 is splined on the driven shaft 111, the latter is driven directly through a locked pinion connection.

However, when brake band 139 is engaged to retard or halt rotation of drum 132, as by a suitable speed controlled instrumentality (not shown), the clutch disks 124 are disengaged through the action of the clutch throw-out plate 135, whereupon the retarded or halted reaction gear 115 causes epicyclic travel of pinions 114 around the reaction gear periphery. This reduces the rate of speed of the planetary carrier 113 secured to the driven shaft in any desired forward ratio. In such ratio the flywheel action of the propeller is fully availed of in smoothing the transmission and application of torque. As stated, the brake band 139 may be brought into action automatically under the control of the propeller or engine speed, to change the drive ratio, by suitable devices designed for that end.

The above planetary clutch and drum parts are enclosed in a suitable housing 145, in which the outer end of shaft 111 is carried by a ball bearing 146. An oil seal 147 prevents leakage of lubricant or entry of dirt at this point. The inner end of shaft 111 is carried by suitable anti-friction bearing 140 on the hollow driving shaft 110.

It will be appreciated from the foregoing that, though drums 22 and 117 are referred to as clutch "driven" drums, since the clutch is the source of its rotative torque, in actuality these drums and respective reaction members 19, 115 thereon, are brake controlled reaction members, in accordance with the rate of rotation (or absence of rotation) of which the ultimate speed of the output shaft is determined.

With reference to the matter of transmission of power through the respective devices illustrated in Figs. 1 and 4, it will be appreciated that the former has as a driver a sun gear 18 keyed on the drive shaft 11 and effective through a planetary pinion on an external ring-like reaction gear, while in the latter an external ring-like driving gear 119 is effective through a planetary pinion with an internal reaction gear. In the latter case smaller drive ratios are available than when the power is applied from an internal gear.

It will also be evident that in each embodiment I have provided a planetary-type change speed mechanism of great compactness and ruggedness, incorporating a multiple disk clutch as an essential part thereof, with an improved and always positive driving connection between the initial drive member, clutch and the driven member. As a result, the heavy loads which are imposed on a structure of this type are readily absorbed by the clutch elements without the fraying, undue wearing or destruction such as might otherwise be expected; and a never-failing control, with positive output torque, is afforded. A single brake band operation releases the clutch and halts the reaction member to effect drive in the lower ratio. In neither high nor low gear ratio is there any overrunning effect and the engine and driven shaft are connected by a two-way control under positive torque at all times.

With reference to the lost motion connection between the brake drum and inner member controlled thereby, as illustrated in Fig. 6, which structure is equally applicable in the embodiment of Figs. 1, 2 and 3 in substitution for the toothed lost motion drive, since the respective parts are practically identical, it is pointed out that the use of an enlarged hole 137 in one drum and a stud extending therethrough in angular driving relation to a second drum and axial shifting relation to the end clutch plate provides the desired few degrees of angular lost motion in a structure which is exceedingly simple and inexpensive to manufacture, as compared to the toothed arrangement of Fig. 1 or the alternative arrangement illustrated in my copending application Serial No. 588,222. I therefore desire the representation of Fig. 6 to be considered as a modified embodiment of lost motion connection for the spaced tooth device of Fig. 1, which provides the same result in a structure considerably easier and cheaper to manufacture.

I claim:

1. In a change speed mechanism, rotatable driving and driven members, a rotatable reaction member coaxial therewith, a planetary pinion carried by the driven member for rotation therewith, said reaction member and driving member each having gear teeth meshing with said pinion to transmit torque between said first named members through the pinion at different speed ratios in accordance with the relative speed of rotation of the reaction member, means to control said speed of rotation of the reaction member, a releasable clutch including coacting clutch elements directly and drivingly engaged respectively with said reaction member and with said driving member to govern relative rotation thereof, whereby said planetary pinion travels relative to the teeth of said reaction member and said driving member upon release of the clutch, said pinion being relatively restrained from said travel when the clutch is engaged, and means responsive to said speed control means to operate said clutch, including a lost motion device to actuate said clutch in predeterminedly timed relation to operation of said speed control means.

2. A change speed mechanism in accordance with claim 1, in which said planetary pinion is rotatably mounted on a planetary carrier having an axially extending bearing element and said reaction member is sleeved over said bearing element in anti-friction rotatable engagement therewith, said speed control means including a drum secured to said reaction member and having an annular, axially extending braking portion internally housing said reaction member and clutch elements, said driving member being in driving engagement with said planetary pinion internally of said braking portion of said drum.

3. A change speed mechanism comprising rotatable driving and driven members, a rotatable reaction member coaxial therewith, a planetary carrier rotating with one of said first named driving and driven members, a planetary pinion rotatably mounted on said carrier, said reaction member and driving member each having driving engagement with said pinion to transmit torque between said driving and driven members through the pinion at different speed ratios in accordance with the relative speed of rotation of the reaction member, means to control said speed of rotation of the reaction member, a releasable clutch including coacting clutch elements operatively engaged respectively with said reaction and driving members to govern relative rotation thereof, whereby said planetary pinion travels relative thereto upon release of the clutch, said pinion being relatively restrained from said travel when the clutch is engaged, and means responsive to said speed control means to operate said clutch, said planetary carrier having an axially extending bearing element and said reaction member being sleeved over said bearing element in anti-friction rotatable engagement therewith, said speed control means including a drum secured to said reaction member and having an annular, axially extending braking portion internally housing said reaction member and clutch elements, said driving member being in driving engagement with said planetary pinion internally of said braking portion of said drum.

4. A change speed mechanism in accordance with claim 3, in which said planetary carrier is secured to the driven member for rotation therewith, and in which said clutch elements are in direct driving engagement with the interior of said drum and with said driving member respectively.

5. A change speed mechanism comprising a pair of rotatable driving and driven members, a rotatable reaction member coaxial therewith, a planetary pinion carried by said driven member for rotation therewith, said reaction member and one of said pair of members each having gear teeth meshing with said pinion to transmit torque between said driving and driven members through said planetary pinion at different speed ratios in accordance with the relative speed of rotation of the reaction member, means to control said speed of rotation of the reaction member, a releasable clutch including coacting clutch elements drivingly engaged respectively with said reaction member and with one of said pair of members to govern relative rotation thereof, whereby said planetary pinion travels relative to the teeth of the members meshed thereby upon release of the clutch, said pinion being relatively restrained from said travel when the clutch is engaged, and means responsive to said speed control means to operate said clutch, including a lost motion device to actuate said clutch in predeterminedly timed relation to operation of said speed control means, said speed control means comprising a pair of coaxial, rotary control members, said lost motion device comprising a axially shiftable throw out element coaxial with said last named members, said throw out element having stud means thereon extending through and in angular driving relation to one of said last named members, the other of said last named members having an aperture of substantially larger diameter than said stud means through which the latter also extends, whereby to couple said last named members for rotation as a unit following retardation of one thereof and relative lost motion rotation of said last named members, said stud means having axial shifting engagement with one of said clutch elements, and means operative on said throw out element to shift said stud means and last named clutch element axially upon relative rotation of said pair of rotary control members.

6. A change speed mechanism in accordance with claim 1, in which said speed control means comprises a pair of coaxial, rotary control members and said lost motion device comprises an axially shiftable throw out element coaxial with said last named members, said throw out element having stud means thereon extending through and in angular driving relation to one of said last named members, the other of said last named members having an aperture of substantially larger diameter than said stud means through which the latter also extends, whereby to couple said last named members for rotation as a unit following retardation of one thereof and relative lost motion rotation of said last named members, said stud means having axial shifting engagement with one of said clutch elements, and means operative on said throw out element to shift said stud means and last named clutch element axially upon relative rotation of said pair of rotary control members.

OSCAR H. BANKER.

REFERENCES CITED

The following references are of record in the file of this patent:

UNITED STATES PATENTS

| Number | Name | Date |
| --- | --- | --- |
| 1,268,131 | Ledwinka | June 4, 1918 |
| 1,421,644 | Wills | July 4, 1922 |
| 1,424,446 | Buckendale | Aug. 1, 1922 |
| 1,441,521 | Osborn | Jan. 9, 1923 |
| 1,693,079 | Jackson | Nov. 27, 1928 |
| 1,755,804 | Barbarou | Apr. 22, 1930 |
| 1,772,685 | Pollak | Aug. 12, 1930 |
| 1,861,482 | Sifton | June 7, 1932 |
| 1,865,648 | Sifton | July 5, 1932 |
| 2,002,951 | Levin | May 28, 1935 |
| 2,094,278 | Morin | Sept. 28, 1937 |
| 2,095,140 | Leeson | Oct. 5, 1937 |
| 2,115,964 | Osborne | May 3, 1938 |
| 2,136,971 | Fleischel | Nov. 15, 1938 |
| 2,230,339 | Shaw | Feb. 4, 1941 |
| 2,241,088 | Griswold | May 6, 1941 |
| 2,254,355 | Vincent | Sept. 2, 1941 |
| 2,486,815 | Banker | Nov. 1, 1949 |